United States Patent [19]

Waddell et al.

[11] Patent Number: 5,612,431

[45] Date of Patent: Mar. 18, 1997

[54] LEACHING OF PRECIOUS METAL ORE WITH FLUOROALIPHATIC SURFACTANT

[75] Inventors: Jennifer E. Waddell, Burnsville; Michael J. Sierakowski, Stillwater; Patricia M. Savu, Maplewood; George G. I. Moore, Afton; Chetan P. Jariwala; Miguel A. Guerra, both of Woodbury, all of Minn.

[73] Assignee: Minnesota Mining and Manufacturing Company, St. Paul, Minn.

[21] Appl. No.: 474,271

[22] Filed: Jun. 7, 1995

Related U.S. Application Data

[63] Continuation of Ser. No. 309,924, Sep. 21, 1994.

[51] Int. Cl.$^6$ .................................. C08F 12/30
[52] U.S. Cl. .......................... 526/243; 526/245
[58] Field of Search .................................. 526/243, 245

[56] References Cited

U.S. PATENT DOCUMENTS

| | | |
|---|---|---|
| 1,519,396 | 12/1924 | Darrow . |
| 1,549,856 | 8/1925 | Darrow . |
| 2,234,140 | 3/1941 | Falconer et al. . |
| 2,803,615 | 8/1957 | Ahlbrecht et al. ............... 260/29.6 |
| 3,787,351 | 1/1974 | Olson ................................ 260/40 R |
| 3,950,298 | 4/1976 | McCown et al. ............... 260/33.6 F |
| 4,102,916 | 7/1978 | Falk ................................ 260/501.12 |
| 4,666,977 | 5/1987 | Kihara et al. . |
| 4,668,406 | 5/1987 | Chang .............................. 252/8.75 |
| 4,791,167 | 12/1988 | Saukaitis ........................... 524/544 |
| 4,873,020 | 10/1989 | Muggli ............................... 252/355 |
| 4,929,274 | 5/1990 | Luttinger . |
| 4,975,363 | 12/1990 | Cavallo et al. . |
| 4,988,771 | 1/1991 | Takeuchi et al. . |
| 5,061,459 | 10/1991 | Bennett et al. ..................... 423/29 |
| 5,147,938 | 9/1992 | Kuller ................................ 525/276 |
| 5,207,996 | 5/1993 | Sierakowski et al. . |
| 5,468,812 | 11/1995 | Muggli et al. ..................... 525/293 |

FOREIGN PATENT DOCUMENTS

| | | |
|---|---|---|
| 0351364 | 6/1989 | European Pat. Off. . |
| 0364772 | 4/1990 | European Pat. Off. . |
| 0383310 | 8/1990 | European Pat. Off. . |
| 2310357 | 9/1973 | Germany . |
| 3172849 | 7/1991 | Japan .............................. C03F 7/00 |
| 919627 | 12/1991 | South Africa . |
| 1123829 | 8/1968 | United Kingdom ............ C08F 15/16 |
| 2010874 | 7/1979 | United Kingdom ............ C08G 65/32 |
| 8201007 | 4/1982 | WIPO . |

OTHER PUBLICATIONS

*Kirk–Othmer Encyclopedia of Chemical Technology*, 3rd edition, vol. 11, pp. 972–975 & 992, and vol. 21 pp. 1–6 & 15.

J.B. Hiskey, *Arizona Bureau of Geology and Mineral Technology Fieldnotes*, vol. 15, No. 4, Winter 1995.

N.C. Wall, J.C. Hornby, and J.K. Sethi, "Gold Benefication," *Mining Magazine*, pp. 393–401, May 1987.

"Chemistry of Gold Extraction," pp. 35, 105–106, J. Marsden & I. House, Ellis Horwood, Ltd., 1992, ISBN 0–13–131517–X.

"Extractive Metallurgy of Gold," J.C. Yannapolous, pp. 115–117 & 127, Van Nostrand Reinhold, 1991.

*Primary Examiner*—Joseph L. Schofer
*Assistant Examiner*—N. Sarofim
*Attorney, Agent, or Firm*—Gary L. Griswold; Walter N. Kirn; John A. Fortkort

[57] ABSTRACT

A method for improving the recovery of gold and silver from precious metal ore is disclosed. The method comprises contacting precious metal ore with an aqueous solution containing certain fluoroaliphatic surfactants.

2 Claims, No Drawings

LEACHING OF PRECIOUS METAL ORE WITH FLUOROALIPHATIC SURFACTANT

This is a continuation of application Ser. No. 08/309,924 filed Sep. 21, 1994.

This invention relates to a process for leaching of precious metal (e.g., gold or silver) values from low grade ore heaps with aqueous alkaline cyanide lixiviant. In another aspect, this invention relates to polymeric, fluoroaliphatic-containing surfactants.

The recovery of gold and silver values from low grade ores using oxidative cyanidation is well known. See, e.g., *Kirk-Othmer Encyclopedia of Chemical Technology*, 3rd Edition, Vol. 11, pp. 972–992 and Vol. 21, pp. 1–15. Such recovery has been used commercially since the late 1960s. Typically, in gold heap leaching, a dilute aqueous solution of sodium cyanide and lime, having a pH of between about 10.5 and 12.5, is distributed over the top of an ore heap. Ore heaps are usually 100,000 to 500,000 tons in weight, containing pieces having diameters ranging from less than ½ inch to greater than 6 inches, and are piled on an impervious pad. According to J. B. Hiskey, *Arizona Bureau of Geology and Mineral Technology Fieldnotes*, Vol. 15, No. 4, Winter 1985, gold is dissolved in an aerated cyanide solution according to the following two-step reaction sequence:

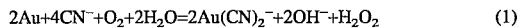

The complexed gold is then recovered from the aqueous solution, usually by adsorption onto activated carbon, said complex being later stripped and converted to elemental gold by electrowinning. The spent cyanide aqueous solution is then recirculated to the heap for further leaching, with some replenishment of cyanide if necessary. Silver heap leaching is done in an analogous way to form the $Ag(CN)_2^-$ complex, from which silver is usually recovered using zinc dust metal displacement. According to Hiskey Supra, when compared with conventional milling (i.e., crushing, grinding, and agitation leaching), recovery of gold and silver by heap leaching offers several advantages: lower capital and operating costs, shorter start-up times, and fewer environmental risks. These advantages, however, are sometimes offset by lower metal extractions, as typically only 60–80% of available precious metal values can be recovered using this procedure. Many of the larger ore pieces in heaps are poorly wet and consequently are poorly extracted. When the ore is crushed into smaller pieces to improve extraction, fines are produced which can plug the heap, especially at the bottom, reducing the rate of leachate flow through the heap.

Various methods to improve metal extractions using cyanide heap leaching are found in the art. Such methods include agglomeration of the heap, heating of the leachate, air injection, and bio-oxidation techniques. See, e.g., N. C. Wall, J. C. Hornby, and J. K. Sethi, "Gold Beneficiation," *Mining Magazine*, pp. 393–401, May 1987.

The use of certain hydrocarbon additives to improve precious metal recoveries during cyanidation has been disclosed. U.S. Pat. No. 1,519,396 (Darrow) discloses the use of long chain fatty acid sodium or potassium salts for treating precious metal ores prior to leaching. U.S. Pat. No. 1,549,856 (Darrow) discloses mixing precious metal ores with oleaginous substances and the previously disclosed fatty acid salts. U.S. Pat. No. 2,234,140 (Falconer et al.) discloses the use, as wetting agents, of sulfated higher molecular weight alcohols, sulfonated esters of higher alcohols and dibasic acids, alkylated aryl sulfonates, sulfosuccinate acid esters of alcohols, and alkyl naphthalene sulfonates. South African Patent Application 919,627 describes the use of alkyl ether sulfates in cyanide leachates to improve gold recoveries from ores.

U.S. Pat. No. 4,929,274 (Luttinger) describes the use of certain surfactants in the cyanide leach solution in the leaching of precious metal ores. Suitable surfactants are those that readily hydrolyze under alkaline conditions. Such surfactants are said to improve the metal value recovery rate without affecting carbon efficiency in the subsequent metal absorption step. The non-interference with the carbon is thought to be due to the hydrolysis of the surfactant, thus keeping the activated carbon surfaces more available for metal cyanide absorption.

The use of fluoroaliphatic surfactants to improve copper recovery during acid heap leaching of copper ore is described in U.S. Pat. No. 5,207,996 (Sierakowski et al.).

DESCRIPTION OF THE INVENTION

Briefly, the present invention provides, in one aspect, an improved method for leaching of precious metal (gold and silver) values from precious metal ore comprising: contacting, for example, by drip irrigation, said ore with an aqueous solution comprising fluoroaliphatic surfactant. Said contact with an aqueous solution comprising fluoroaliphatic surfactant is prior to or during extraction of precious metal. Said aqueous solution comprising fluoroaliphatic surfactant can, therefore, be a pretreatment aqueous solution or the aqueous solution used to extract the precious metal. The precious metal can be extracted and recovered by conventional means. Gold and silver are typically extracted with a high pH (10 to 11.5), lime-containing, aqueous alkaline cyanide solution ("lixiviant"). Gold is typically recovered by adsorption on activated carbon followed by electrowinning. Silver is typically recovered by precipitation with zinc metal. In the method of this invention, the fluoroaliphatic surfactant can be present in the lixiviant, or in an aqueous solution which contacts the ore prior to extraction, or both. The fluoroaliphatic surfactant is soluble in the aqueous solution in an amount sufficient to increase the amount of metal extracted, can lower the surface tension of the aqueous solution to 40 dynes/cm or less at a concentration of 250 ppm solids or less, is not readily degraded in aqueous alkaline cyanide solutions, and does not significantly reduce gold adsorptivity on activated carbon. Preferably, the fluoroaliphatic surfactant is soluble in high pH, lime-containing, aqueous alkaline cyanide solution.

In another aspect, this invention provides new polymeric, sulfonic acid-containing, or sulfonic acid salt-containing surfactants.

The fluoroaliphatic surfactants useful in this invention increase the amount of precious metal extracted from the ore. The increase in precious metal extraction is especially evident with larger size ore particles. Thus, ore heaps with larger size fraction distribution can be used during heap leaching, minimizing crushing costs and reducing heap plugging or blinding caused by fines.

Comminution of precious metal ores is primarily required to liberate gold, gold bearing minerals, and other metals of economic value to make them amenable to extraction. The degree of comminution required depends on many factors, including the liberation size of gold, the size and nature of the host minerals, and the method, or methods, to be applied for gold recovery. The optimum particle size distribution is dictated by the economics; a balance between gold recovery, processing costs, and comminution costs. See, e.g., "Chemistry of Gold Extraction," pp. 35, 105–106, J Marsden and I. House, Ellis Horwood Ltd., 1992 ISBN 0-13-131517-X.

The extent of ore crushing required to achieve good permeability, uniform distribution of the cyanide leach solution, and satisfactory gold extraction, has a paramount effect on the economics of the projected heap leaching. Either an excessive proportion of clays in the ore, or fines generated by crushing, may slow the percolation rate of the leach solution causing channeling and unproductive lixiviant contact with materials in the heap. Agglomeration of the crushed ore is frequently required to get a permeable and uniform feed to the heaps. Crushing circuits and agglomeration systems are capital intensive and should be used in a commercial operation only if and when their capital and operating costs can be more than justified by the overall economics of the operation. See, e.g., "Extractive Metallurgy of Gold," J C Yannapolous, pp. 115–117, Van Nostrand Reinhold, 1991.

Typical gold/silver heap leach operations may incorporate multiple crushing stages in order to make the ore more amenable to heap leaching and subsequent dissolution and recovery of gold and silver by cyanidation. The ultimate objective is to establish the design and operating conditions leading to the lowest cost per ounce of gold and silver extracted. This goal can only be reached if the optimum combination of low operating costs and high gold and silver recoveries are achieved. See, e.g., "Extractive Metallurgy of Gold," J. C. Yannapolous, supra.

In the method of this invention fluorosurfactants may be used in any aqueous solution that contacts the ore prior to or during extraction of precious metal from the ore. For example, fluorosurfactants could be incorporated in an aqueous pretreatment solution, in an aqueous agglomeration solution, the lixiviant itself, or combinations thereof. The aqueous solution containing the fluorosurfactant can vary depending of the particular purpose of the solution. For example a pretreatment solution could, for example, be simply an aqueous solution containing only water and surfactant.

We have discovered that the effects of particle size on the economics of cyanide leaching and pretreatment followed by cyanide leaching can be significantly impacted by the use of fluorochemical surfactants. The use of fluorosurfactants may eliminate one of the final stages of crushing since they allow greater permeation of the ore by the lixiviant.

If the nature of the ore is such that it still requires agglomeration, even if a surfactant is used to eliminate a crushing stage, the addition of a fluorosurfactant during the agglomeration step would be an effective pretreatment method prior to irrigation with alkaline cyanide to ensure complete wetting and lixiviant contact with the ore.

Crushed ores are typically agglomerated by mixing 5 to 10 pounds portland cement or lime per ton of dry solids, adding 8–16% moisture as either strong cyanide solution or water, mechanically tumbling the wetted mixture, and curing the agglomerated feed for at least 8 hours and preferably 24–48 hours before heap leaching. See, e.g., Yannapolous, supra, p. 127. The use of fluorosurfactant in either the cyanide solution or water for agglomeration can establish wetting patterns in the ore particles prior to irrigation.

Alternatively, or in addition to pretreatment during agglomeration, the efficiency of fluorochemical surfactants in improving wetting of the ore by the lixiviant may only require their application during the early stages of heap irrigation. One or two days of ore contact with surfactant containing solution may be sufficient to establish wetting patterns in both the heap and in the individual ore particles. The length of the period of irrigation employing fluorochemical surfactants in the leach solution may vary due to the percolation characteristics inherent in different ore types.

The fluoroaliphatic surfactants useful in this invention can be compounds, oligomers, or polymers, contain one or more fluoroaliphatic radicals and one or more water-solubilizing polar groups, said radicals and groups being connected by a suitable linking group or covalent bond. The surfactants preferably contain at least about 5% by weight fluorine, i.e. carbon-bonded fluorine, more preferably at least about 10%, the predominant amount or essentially all of which is located in the fluoroaliphatic radical or radicals.

The fluoroaliphatic surfactant is preferably dissolved in said cyanide leachate, or in an aqueous pretreatment solution, in sufficient amount to lower the surface tension of the solution to 40 dynes/cm or lower. For economic benefit and to reduce the probability of interference with carbon adsorption, it is preferable to use only as much of the surfactant as necessary in the leaching or pretreatment solutions, preferably not more than 100 ppm.

In the practice of this invention, the manipulative steps and condition of leaching and metal recovery are otherwise conventional steps or techniques. These conventional operations are well-known to those skilled in the art, and for purposes of brevity will not be further described in detail herein. Such methods are described, for example, in the J. B. Hiskey article, supra.

A useful class of fluoroaliphatic surfactants are those which can be represented by Formula I:

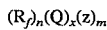

$(R_f)_n(Q)_x(Z)_m$ where $R_f$ is a fluoroaliphatic radical or group, and n is 1 or 2. $R_f$ can be generally described as a fluorinated, preferably saturated, monovalent, non-aromatic radical containing at least 3 carbons. $R_f$ may be straight chain, branched chain, or, if sufficiently large, cyclic, and may include oxygen, trivalent nitrogen or hexavalent sulfur atoms bonded only to carbon atoms. A fully fluorinated radical is preferred, but hydrogen and chlorine atoms may be present in the radical provided that not more than one atom of either is present for every two carbon atoms. While radicals containing a large number of carbon atoms will function adequately, surfactants containing not more than about 20 carbon atoms are preferred since larger radicals usually represent a less efficient utilization of fluorine than is achieved with shorter chains. Fluoroaliphatic radicals containing about 4 to 12 carbon atoms are most preferred. The fluoroaliphatic radical preferably contains about 40% to about 78% fluorine by weight, more preferably about 50% to 78% fluorine by weight. The $R_f$ radical preferably terminates in a perfluorinated moiety which preferably contains at least 7 fluorine atoms, e.g., $CF_3OCF_2CF_2O$—, $CF_3CF_2CF_2$—, $(CF_3)_2CF$—, $F_5SCF_2$—, or the like.

In Formula I, Q is a linking group and x is 0 or 1. Note that when x is 0, Q is absent and $R_f$ and Z are connected by a covalent bond. Q is a multifunctional linking group such as alkylene (e.g., methylene, ethylene, propylene, and cyclohexylene), arylene (e.g., phenylene), combinations thereof (e.g., xylylene), or combinations with hetero atom-containing moieties such as oxy, thio, carbonyl, sulfonyl, sulfinyl, sulfonamido, carbonamido, urylene, carbamato, and imino. For example, Q can be sulfonamidoalkylene, carbonamidoalkylene, oxydialkylene (e.g., —$C_2H_4OC_2H_4$—), thiodialkylene (e.g., —$C_2H_4SC_2H_4$—), alkylenecarbamato and the like. The Q groups for a specific composition will depend upon the specific reactants used in preparing the surfactant.

In Formula I, Z is a water-solubilizing polar group which may be anionic, nonionic, cationic or amphoteric, and m is preferably 1 or 2. Z is selected such that the fluoroaliphatic surfactant is soluble in, but not degraded by, the aqueous alkaline cyanide lixiviant. In general, Z can be selected from a wide variety of water-solubilizing polar groups.

Useful anionic Z groups include sulfonates, e.g., $-SO_3M$, and sulfates, e.g., $-OSO_3M$, where M is a hydrogen or metal cation, such as sodium or calcium, or where M is an ammonium or other nitrogen-based cation. The cation associated the sulfonate or sulfate does affect solubility and cations should be chosen which allow the surfactant to be soluble in the solution, e.g., water or lixiviant. For example, a potassium cation often gives sulfonates or sulfates which have low or poor solubility in aqueous solutions.

A subclass of the sulfonates useful in this invention are those which have polyoxyalkylene ammonium cations. Such polyoxyalkylene ammonium cations, must contain sufficient polyoxyethylene units to be soluble in the lixiviant. These sulfonates can be prepared by reacting poloxyalkyleneamine compounds, such as those described in U.S. Pat. No. 4,975,363 (Cavallo et al.), with fluoroaliphatic sulfonyl fluorides, e.g., $C_8F_{17}SO_2F$. Such reactions will generally result in a mixture comprising sulfonic acid amine salts and the corresponding sulfonamides. For example, reaction of 0.16 moles of Jeffamine™ ED-600 polyoxylalkylene amine with 0.32 moles of $C_8F_{17}SO_2F$ gave a mixture of 60 % by weight of $2(C_8F_{17}SO_3^-)$ $H_3N^+CH$ $(CH_3)CH_2[OCH(CH_3)CH_2]_a$ $[OCH_2CH_2]_b-[OCH_2CH(CH_3)]_cNH_3^+$, and 40% by weight of $C_8F_{17}SO_2N(H)CH(CH_3)CH_2[OCH(CH_3)CH_2]_a$ $[OCH_2CH_2]_{b[OCH_2}CH(CH_3)]_c-N(H)O_2SC_8F_{17}$, where a+c is 2.5 and b is 8.5. The sulfonamide proton can be removed in basic media to give an anionic compound which will likely be soluble. Therefore, the sulfonamide compound, itself may be useful in the methods of this invention.

Anionic groups generally not useful are phosphates and carboxylates because they generally are too insoluble in the lixiviant. However, certain perfluoro(alkylether), carboxylates which do not terminate after the final ether oxygen, in a perfluoroalkyl group having more than 8 carbon atoms are soluble and surface active in the lixiviant and are therefore useful in the present invention, for example $C_8F_{17}O(C_2F_4O)_2CF_2CO_2H$ and $C_5F_{11}O(CF_2)_5CO_2^{-+}NH_4$ are useful.

Useful nonionic Z groups include those containing sufficient poly(oxyethylene) to be soluble in the lixiviant, e.g.,
$-(C_2H_4O)_7CH_3$, $-(C_2H_4O)_{14}H$,
$-(C_2H_4O)_{10}(C_3H_6O)_{22}(C_2H_4O)_{10}-H$, and
$-(C_2H_4O)_{16}-CH_3$.

Useful cationic surfactants include those where Z contains an ammonium group and which have a large polarizable counter-anion (e.g., $I^-$) and are N-hydro-substituted sulfonamides.

Useful amphoteric surfactants include those where Z contains sulfoammonium and carboxyammonium groups such as $-SO_2N(C_3H_6SO_3^-)C_3H_6N^+(CH_3)_2C_2H_4OH$, $-N^{+(CH}{}_3)_2C_2H_4COO^-$, and $-SO_2N(C_2H_4COO^-)C_3H_6N^+(CH_3)_2H$.

A second class of fluoroaliphatic surfactants useful in this invention include oligomers and polymers which have a plurality of fluoroaliphatic groups pendant from an oligomeric or polymeric backbone and containing water-solubilizing moieties selected from anionic, cationic, nonionic and amphoteric moieties, preferably either nonionic or anionic moieties, and compatible combinations of such moieties. Such water-solubilizing moieties are preferably poly(oxyalkylene) and a combination of poly(oxyalkylene) moieties with sulfonate moieties. Particularly preferred poly(oxyalkylene) moieties are those in which at least 40% of the oxyalkylene repeat units are oxyethylene units. These fluorochemical oligomers have about 5 to 40 weight percent, more preferably about 10 to 30 weight percent, carbon-bonded fluorine, based on the weight of oligomer or polymer, the fluorine content residing in said plurality of pendent fluoroaliphatic radicals. These materials are preferably relatively low molecular weight, branched or lightly crosslinked polymers, containing from 3 to 4 up to about 25 or 30 monomer-derived or interpolymerized units, and thus are oligomeric, as contrasted to "high polymers" having a molecular weight of 100,000 or higher. A particularly useful class of poly(oxyethylene)-containing oligomers or polymers includes polyacrylates with pendent fluoroaliphatic groups. Oligomers and polymers of these types are described, for example, in U.S. Pat. 3,787,351 (Olson) and U.S. Pat. 4,668,406 (Chang), both of which descriptions are incorporated herein by reference. Also useful are poly(oxyethylene)-containing oligomers or polymers of the types described by Olson and Chang which have incorporated in them pendent sulfonate moieties made by, for example, copolymerizing N-(3-sulfo-2,2-dimethylpropyl)acrylamide (AMPS) with fluoroaliphatic (meth)acrylate and poly(oxyalkylene) (meth)acrylate monomers.

A novel class of polymeric surfactants useful in this invention are those Dolymers comprising (A) at least 40% by weight, preferably at least 50% by weight, of interpolymerized units derived from $C_nF_{2n+1}(SO_2NR_1)_a(CH_2)_bOC(O)C(R_2)=CH_2$ a is 0 or 1, b is 1 to 12, preferably 1 to 6; (B) at least 5% by weight of interpolymerized units derived from sulfonic acid containing, or sulfonic acid salt containing, free-radically polymerizable, ethylenically-unsaturated monomer; and (C) interpolymerized units derived from a polar, free-radically polymerizable, ethylenically-unsaturated monomer. Particularly preferred sulfonic acid containing or sulfonic acid salt containing monomers are acrylates and methacrylates. Useful polar monomers include: acid containing monomers such as acrylic acid, methacrylic acid, and carboxyethyl acrylate; hydroxy containing monomers such as hydroxyethyl acrylate and hydroxyethyl methacrylate; polyether containing monomers such as ethoxyethoxyethyl acrylate, ethoxyethoxyethyl methacrylate, poly(oxyalkylene) acrylates and methacrylates; and amide containing monomers such as acrylamide.

The novel polymers of this invention can be prepared by conventional free-radical polymerization methods. See, e.g., U.S. Pat. No. 4,988,771 (Takeuchi et al.), U.S. Pat. No. 4,666,977 (Kihara et al.), and European Patent Publication No. 0351364 (Mueller). Fluoroaliphatic surfactants which are useful in this invention include:

ANIONIC
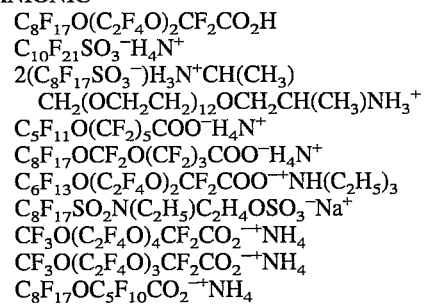

$^-OOC(CF_2)_3[O(CF_2)_4]_xO(CF_2)_3COO^-2(^+NH_4)$
where x=0 to 3

$2(C_2F_{17}SO_3^-)H_3N^+CH(CH_3)CH_2[OCH(CH_3)CH_2]_a$
$[OCH_2CH_2]_b-[OCH_2CH(CH_3)]_cNH_3^+$ where a+c= 2.5 and b=8.5 a 62/18/20 (wt %) terpolymer of
$C_8F_{17}SO_2N(C_2H_5)CH_2CH_2OC(O)CH=CH_2$,
$CH_2=CHC(O)O(CH_2CH_2O)_{10}(C_3H_6O)_{22}(C_2H_4O)_{10}H$, and
$CH_2=CHC(O)N(H)C(CH_3)_2CH_2SO_3^-Na^+$ a 65/15/20 (wt %) terpolymer of
$C_8F_{17}SO_2N(C_4H_9)CH_2CH_2OC(O)CH=CH_2$,
$CH_2=CHC(O)O(CH_2CH_2O)_{17}CH_3$ and
$CH_2=CHC(O)N(H)C(CH_3)_2CH_2SO_3H$ NONIONIC
$C_8F_{17}SO_2N(C_2H_5)C_2H_4O(C_2H_4O)_{6.2}CH_3$
$C_8F_{17}SO_2N(C_2H_5)C_2H_4O(C_2H_4O)_{13}H$
$C_8F_{17}(CH_2CH_2O)_nH$ where n is 6 to 11 a 30/70 (wt %) copolymer of
$C_8F_{17}SO_2N(C_2H_5)CH_2CH_2OC(O)C(CH_3)=CH_2$ and
$CH_2=CHC(O)O(CH_2CH_2O)_{17}CH_3$ a 30/70 (wt %) copolymer of
$C_8F_{17}SO_2N(C_4H_9)CH_2CH_2OC(O)CH=CH_2$ and
$CH_2=CHC(O)O(C_2H_4O)_{10}(C_3H_6O)_{22}(C_2H_4O)_{10}H$ CATIONIC
$C_8F_{17}SO_2N(H)CH_2CH_2CH_2N^+(CH_3)_3I^-$
cyclic-$C_6F_{11}C(O)N(H)(CH_2)_3N^+(CH_3)_3I^-$
$C_8F_{17}CH_2CH_2SCH_2CH_2N^+(CH_3)_3CH_3SO_4^-$ AMPHOTERIC
$C_6F_{13}SO_2N[CH_2CH(OH)CH_2SO_3^-]CH_2CH_2CH_2N^+$
$(CH_3)_2CH_2CH_2OH$
$C_6F_{13}SO_2N(CH_2CH_2COO^-)^{CH}{}_2CH_2CH_2N^+(CH_3)_2H$
$CF_3$-cyclic-$C_6F_{11}C(O)N(CH_2CH_2COO^-)^{(CH}{}_2)_3N^+$
$(CH_3)_2H$
$C_8F_{17}CH_2CH(OCOCH_3)CH_2N^+(CH_3)_2CH_2CO_2^-$ Examples of fluoroaliphatic surfactants not useful in this invention are given below.

ANIONIC
$C_8F_{17}SO_2N(C_2H_5)CH_2CH_2OP(O)(OH)_2$
$C_8F_{17}CH_2CH_2OP(O)(O^-)_2\ 2NH_4^+$
$[C_8F_{17}SO_2N(C_2H_5)CH_2CH_2O]_2P(O)(O^-)H_4N^+$
$C_{13}F_{27}COO^-H_4N^+$
$C_8F_{17}SO_2N(C_2H_5)CH_2COO^-K^+$
$^-OOC(CF_2)_{10}COO^-2(H_4N^+)$
$C_{12}F_{25}OCF_2CO_2^{-+NH}{}_4$
$C_8F_{17}SO_3^-K^+$
$C_4F_9SO_3^-K^+$
$C_8F_{17}SO_3^-H_2N^+(C_2H_4OH)_2$
$C_3F_7CH_2OC(O)CH(SO_3^-)CH_2C(O)OCH_2C_3F_7Na^+$ a 75/25 (wt %) copolymer of
$C_8F_{17}SO_2N(C_2H_5)CH_2CH_2OC(O)CH=CH_2$ and
$CH_2=CHC(O)OCH_2CH_2COOH$

NONIONIC
$C_6F_{13}SO_2N(CH_2CH_2OH)_2$

CATIONIC
$C_8F_{17}SO_2N(H)CH_2CH_2CH_2N^+(CH_3)_3Cl^-$
$C_8F_{17}SO_2N(CH_3)CH_2CH_2CH_2N^+(CH_3)_3I^-$
$C_4F_9CF(C_2F_5)C(O)OCH_2CH_2N^+(CH_3)_3I^-$

EXAMPLES

Objects and advantages of this invention are illustrated in the Examples and Comparative Examples below.

SURFACTANT 1

Fluorad™ Fluorochemical Surfactant FC-120 (available from 3M Co.), a 25% (wt) solids solution of $C_{10}F_{21}SO_3^-$ $H_4N^+$, was diluted with water to form a 10% (wt) solids stock solution.

SURFACTANT 2

Fluorad™ Fluorochemical Surfactant FC-171 (available from 3M Co.), $C_8F_{17}SO_2N(C_2H_5)C_2H_4O(C_2H_4O)_{6.2}CH_3$, where 6.2 is the average value of distribution, was dissolved in water to form a 10% (wt) solids stock solution.

SURFACTANT 3

Fluorad™ Fluorochemical Surfactant FC-135 (available from 3M Co.), a 50% (wt) active solution of $C_8F_{17}SO_2N(H)CH_2CH_2CH_2N^+(CH_3)_3I^-$, was diluted with water to form a 10% (wt) solids stock solution.

SURFACTANT 4

The fluoroaliphatic surfactant of structure $C_5F_{11}O(CF_2)_5COO^-H_4N^+$ was prepared as follows: 118.2 g (1.0 mol) of hexane-1,6-diol, 4.4 g of Adogen™ 464 quaternary ammonium salt (available from Witco Corp.), 80.0 g (2.0 mol) of NaOH and 250 mL of tetrahydrofuran was stirred at reflux. 80 mL of deionized water was added to get better mixing. After 20 minutes more, 151 g (1.0 mol) of n-pentyl bromide was added over 0.5 hour and the contents were stirred overnight at reflux. The reaction mixture was then quenched in 1 L of deionized water, the upper layer was separated and combined with an ether extract of the lower layer, and the mixture was stripped using a rotary evaporator. 100 mL of CHCl$_3$ was added to the resulting stripped layer, then 150 mL of acetyl chloride was added dropwise and subsequently heated at reflux for 4 hours. Solvent was stripped to give the crude product. The crude product, $C_5H_{11}O(CH_2)_6OC(O)CH_3$, was distilled at 125° C. (3 torr) and the distillate was fluorinated by the direct fluorination procedure described, for example, in WO 90/05413 (Costello et al.) and U.S. Pat. No. 4,894,484 (Lagow et al). The fluorinated ester was treated with a 23% (wt) sodium hydroxide aqueous solution and subsequent acidification was done with 50% (wt) aqueous H$_2$SO$_4$. The addition of 3M Fluorad™ FC-75 gave a clear, 2-phase system. The lower phase was stripped and distilled to an essentially pure acid product, $C_5F_{11}O(CF_2)_5CO_2H$, boiling at 90°–110° C. @ 0.4 mmHg. The fluorinated carboxylic acid was treated with an excess of dilute aqueous ammonia to form the ammonium salt which was freeze-dried to a solid and was dissolved in water to form a 5% (wt) solids stock solution.

SURFACTANT 5

A polymeric fluoroaliphatic surfactant was prepared as follows. A 5-L flask was equipped with a reflux condenser and an overhead stirrer. The top of the condenser was connected to a nitrogen line so the reaction contents could be kept under a slight positive pressure to remove oxygen.

$C_8F_{17}SO_2N(C_4H_9)CH_2CH_2OC(O)CH=CH_2$(325 g ), $CH_2=CHC(O)O(CH_2CH_2O)_{17}CH_3$ where 17 is the average value of distribution (75 g), $CH_2=CHC(O)N(H)C(CH_3)_2CH_2SO_3H$(100 g), t-butyl peroctoate (50 g, 50% solids), 3-mercapto-1,2-propanediol (25 g) and isopropanol (2847 g) were charged to the flask, and the contents were heated to 80°–82° C. for 4 hours. Then 18.8 g of NaOH and 400 g of deionized water were premixed and added to the batch. The pH was measured and found to be only 1, so additional NaOH (1.4 g) and water (27 g) were added to the batch to raise the pH to 7–8, indicating complete conversion from the free sulfonic acid to the sodium salt. The batch was allowed to cool to room temperature, 27 g of Celite™ 521 (available from Aldrich Chemical Co.) was added, and the batch was filtered through a buchner funnel. A total of 3015 g of 15% (wt) solids solution (% solids measured by evaporation overnight in a forced air oven set at 70° C.) was obtained, representing a 90% yield. This surfactant solution was diluted with water to form a 10% (wt) solids stock solution.

SURFACTANT 6

The fluoroaliphatic surfactant of structure $C_6F_{13}SO_2N[CH_2CH(OH)CH_2SO_3^-]CH_2CH_2CH_2N^+(CH_3)_2CH_2CH_2OH$ was prepared as described in U.S. Pat. No. 5,207,996, Example 1. This surfactant was dissolved in water to form a 10% (wt) solids stock solution.

Comparative Surfactant C1

The hydrocarbon surfactant Emcol™ 4500 (available from Witco Corp.), a 70% (wt) solids solution of $C^4H_9CH(C_2H_5)CH_2OC(O)CH(SO_3^-)CH_2C(O)OCH_2CH(C_2H_5)C_4H_9Na^+$, a hydrocarbon surfactant with excellent wetting properties, was diluted, with a 90/10 by wt water/isopropanol solution, to form a 10% (wt) solids stock solution. This is the type of surfactant said to be useful in cyanide leaching of precious metal ores in U.S. Pat. No. 4,927,274 (Luttinger).

Examples 1–6 Comparative Examples C1–C2

In Examples 1–6, fluoroaliphatic surfactants of this invention (Surfactants 1–6 respectively) were evaluated as additives to alkaline cyanide lixiviants used to extract gold and silver from low grade ore. In Comparative Example C1 a state-of-the art hydrocarbon surfactant (Comparative Surfactant C1) was evaluated as an additive to alkaline cyanide lixiviants used to extract gold and silver from low grade ore. In Comparative Example C2 no surfactant was added to the lixiviant used to extract gold and silver from low grade ore.

Approximately 3000 lb (1360 kg) leach-feed material was obtained from Coeur Rochester, Inc., a heap leaching operation in Nevada. The ore was mixed without further crushing, then was sifted through four different mesh size screens: ½ inch (1.3 cm), ⅜ inch (0.9 cm), ¼ inch (0.6 cm) and 10 mesh using a Gilson Test Master screen apparatus. The screen analysis for each size fraction for the column test feed was then calculated based on the relative weight % of each size fraction from the test feed screen analysis. Eight 200 lb (90 kg) test charges (one for each Example and Comparative Example) were reconstituted by weight and size distribution and were each placed in a 55 gallon (200 L) steel drum. A composite sample was also produced for head assay and individual screen fraction analysis of gold and silver by fire assay and atomic absorption methods.

Each of the surfactant 1–6 stock solutions was diluted with water to give 10 liters of a 250 ppm surfactant solution. Comparative Surfactant C1 was diluted with water to give a 500 ppm surfactant solution.

Each ore-containing drum was placed on a tilted roller mixer, 90 g of calcium oxide (lime) was added to each drum, and 4 L of one of the above surfactant solutions was added to the first seven drums slowly during mixing to achieve uniform solution distribution. Water with no surfactant was added, in the same manner, to the eighth drum. Each drum was tumbled for about 5 minutes, then the agglomerated ore was unloaded into one of eight 6 ft. (1.8 m) high by 8 in. (20 cm) diameter columns with sides constructed from a section of polyvinyl chloride (PVC) piping and bottom constructed from a circular sheet of PVC with a hole, with a piece of 1-inch PVC tubing inserted snugly through the bottom hole from the outside and connected at the other end through a hole in the lid of a covered 1-gallon narrow mouth plastic jug.

The lixiviants for each Example and Comparative Example were prepared by charging the following ingredients in 55 gal (200 L) drums as summarized in Table 1.

TABLE 1

| Example | Surfactant | Water (L) | CaO (g) | NaCN (g) | Stock Sol'n (g) | Resulting ppm Surfactant |
|---|---|---|---|---|---|---|
| 1 | 1 | 113.3 | 120 | 57 | 282.5 | 250 |
| 2 | 2 | 103.5 | 120 | 52 | 258.8 | 250 |
| 3 | 3 | 105.4 | 120 | 53 | 263.5 | 250 |
| 4 | 4 | 107.2 | 120 | 54 | 536 | 250 |
| 5 | 5 | 113 | 120 | 57 | 282.5 | 250 |
| 6 | 6 | 109.1 | 120 | 55 | 272.8 | 250 |
| C1 | C1 | 107.2 | 120 | 54 | 536 | 500 |
| C2 | None | 113 | 120 | 57 | — | — |

First, approximately 120 L of water was added to each drum, followed by 120 g of calcium oxide (1 g CaO/L H$_2$O). Each of the solutions was allowed to mix for 3 hours, then the exact amount of water charged to each drum was calculated by titrating for hydroxide ion produced by the reaction of the calcium oxide with the water. Then sodium cyanide was added at 0.5 g NaCN/L H$_2$O, the appropriate surfactant stock solution was added to give the desired ppm level, and each solution was mixed again for about 2 hours at ambient conditions (about 95° F. or 35° C.). The final pH of each lixiviant was in the 10–11.5 range.

For each day of the leaching study, fresh lixiviant was used from each drum. The concentrations of each ingredient in the lixiviant was determined prior to each day's leaching due to possible degradation under the aerobic high pH conditions. Each lixiviant was titrated for cyanide and lime and the appropriate amount for replenishment was calculated and added. For the surfactant containing lixiviants, surface tension was used for daily monitoring of the surfactant concentrations in each lixiviant. To develop a baseline, the lixiviant solutions were allowed to stand for 2 days at room temperature, then surface tensions were measured using a duNouy Tensiometer with a platinum ring (deionized water was measured to be 69.6 dynes/cm), as shown by the data in Table 2.

TABLE 2

| Ex. | Surface Tension (dynes/cm) after two days |
|---|---|
| 1 | 19.6 |
| 2 | 18.5 |
| 3 | 18.5 |
| 4 | 14.0 |
| 5 | 32.0 |
| 6 | 15.6 |
| C1 | 25.1 |
| C2 | 68.9 |

The surface-tension values in Table 2 were used as the baseline for monitoring surfactant degradation. Surface tension of each lixiviant was measured every day and the following maximum surface tension guidelines were used: If the lixiviant surface tension was above 25 dynes/cm for Examples 1–4 and 6; was above 35 dynes/cm for Example 5; or was above 45 dynes/cm for Comparative Example C1; an additional 50 ppm of the appropriate surfactant (using the corresponding stock solution) was added to the lixiviant.

As a daily procedure for the leaching tests, each lixiviant was applied to the top of its appropriate ore column at the rate of 0.005 gal/min (19 mL/min) for each of the first 15 days, followed by 0.001 gal/min (4 mL/min) for each of the final 66 days. Solutions were collected daily from the bottom of each column and were submitted for gold and silver analysis using conventional atomic absorption methods. Also measured were pH and cyanide consumption. After 81 days, the leaching study was concluded, the leached residue was unloaded from each column and was allowed to dry. The entire leach residue sample was screened through the same series of screens as for the original screening. Particle size and metal distribution calculations were determined using the weights and assays developed for each individual screen fraction. A composite sample from each leach residue was produced by splitting representative samples of each screen fraction and then analyzing this composite tail sample for gold and silver by fire assay and atomic absorption methods. The results of silver leaching are shown in Table 3 for the individual size fraction for each test column.

TABLE 3

| | Percent Silver Extracted from Screen Size: | | | | |
|---|---|---|---|---|---|
| Ex. | +½" (1.27 cm) | +⅜" (0.95 cm) | +¼" (0.64 cm) | +10 mesh | −10 mesh |
| 1 | 27.66 | 48.68 | 35.63 | 39.22 | 59.93 |
| 2 | 45.30 | 39.81 | 26.58 | 41.90 | 54.26 |
| 3 | 12.67 | 42.37 | 35.73 | 39.01 | 60.70 |
| 4 | 38.28 | 43.12 | 34.14 | 38.81 | 60.80 |
| 5 | 47.73 | 33.28 | 38.67 | 42.74 | 58.80 |
| 6 | 59.68 | 36.95 | 26.28 | 40.57 | 61.21 |
| C1 | 18.26 | 30.27 | 35.08 | 43.67 | 62.89 |
| C2 | 27.05 | 30.59 | 34.04 | 37.77 | 66.52 |

The data in Table 3 show that except for Example 3 with the +½" screen size ore, the percent silver extracted from the larger ore particles (+½" and ⅜" screen size) was greater for Examples 1–6 with lixiviants containing fluoroaliphatic surfactants than with Comparative Example C1 with lixiviant containing dioctylsodium sulfosuccinate hydrocarbon surfactant or with Comparative Example C2 with lixiviant containing no surfactant.

The results of gold leaching are summarized in Table 4 where cumulative recoveries for each test column are shown.

TABLE 4

| Example | % Gold Extracted |
|---|---|
| 1 | 84.2 |
| 2 | 84.6 |
| 3 | 84.6 |
| 4 | 86.3 |
| 5 | 80.7 |
| 6 | 85.0 |
| C1 | 85.8 |
| C2 | 74.8 |

The data in Table 4 show that all of the lixiviants containing surfactants (Examples 1–6 and Comparative Example C1) gave consistently higher gold extraction percentages than did the lixiviant containing no surfactant (Comparative Example C2).

The data in Table 5 show the consumption of calcium oxide and sodium cyanide for each lixiviant during the leaching test. The surface tension listed is the average of all the daily surface tensions measured over the first 60 days of that test. "NOTSA" represents the number of times each surfactant was added to meet the minimum surface tension guidelines set forth earlier.

TABLE 5

| Example | Surf. Tens (dynes/cm) | NOTSA | Consumption (g/kg): CaO | NaCN |
|---|---|---|---|---|
| 1 | 21 | 0 | 1.02 | 0.13 |
| 2 | 23 | 5 | 1.025 | 0.10 |
| 3 | 20 | 0 | 1.02 | 0.105 |
| 4 | 17 | 0 | 0.965 | 0.13 |
| 5 | 30 | 0 | 1.00 | 0.155 |
| 6 | 20 | 1 | 1.025 | 0.10 |
| C1 | 45 | 19 | 0.985 | 0.125 |
| C2 | 69 | — | 1.04 | 0.14 |

The data in Table 5 show that the fluoroaliphatic surfactants (Examples 1–6) required little or no replenishment, indicating good long term stability in the lixiviant. Though the lixiviant in Example 2 required fluoroaliphatic surfactant replenishment on five occasions, its daily surface tension value was never more than 1 dyne/cm greater than its maximum surface tension guideline of 25 dynes/cm. The lixiviant containing dioctyl sodium sulfosuccinate (Comparative Example 1) had to be replenished 19 times in order to maintain its surface tension below its modest guideline level of 45 dynes/cm, which is over 20 dynes/cm higher than the initial value of 25.1 dynes/cm recorded two days after mixing. None of the surfactants adversely affected the consumption of either calcium oxide or sodium cyanide, with their consumption values very close to those values measured historically in full scale heap leaching operations using no surfactants.

The data in Table 6 show the average daily surface tension measured in the pregnant solution during the first 60 days of leaching. The pregnant solution is the gold and silver bearing leachate exiting the ore column. Surfactant concentrations were calculated by measuring surface tensions of the pregnant solutions with the duNouy Tensiometer and comparing these values to surface tensions measured in lixiviant solutions containing known concentrations of surfactant.

TABLE 6

| Example | Surf. Tens (dynes/cm) | Estimated Residual Surfactant Conc. (ppm) |
|---|---|---|
| 1 | 35 | 10 |
| 2 | 35 | 3 |
| 3 | 35 | 3 |
| 4 | 40 | 10 |
| 5 | 62 | 4 |
| 6 | 35 | 10 |
| C1 | 55 | 50 |

The data in Table 6 (Examples 1–6) show that the concentration of each fluoroaliphatic surfactant in the pregnant solution was at a lower level than was the hydrocarbon surfactant (Comparative Example 1), apparently due to greater surfactant retention with the ore particles. This offers the possibility that the fluoroaliphatic surfactant may be needed only during ore pretreatment or during the first few leach days of the process. Equally important, the low concentration of fluorosurfactant in the pregnant solution suggest that it should not interfere significantly with the activated carbon columns used downstream to adsorb gold cyanide complex.

Examples 7–12 and Comparative Example C3

Surfactants 1–6 and Comparative Surfactant C1 were evaluated at 5 ppm and 10 ppm (solids) levels in a synthetic pregnant leach solution containing gold cyanide complex to determine each surfactant's effect on gold loading of carbon. Fluoroaliphatic surfactant estimated residual surfactant concentration were selected to approximately bracket the levels presented in Table 6, while the hydrocarbon surfactant level from Table 6 was lowered from 50 ppm to 5 ppm and 10 ppm for direct comparison. The procedure used to evaluate each surfactant is described below.

Example 7

The synthetic pregnant leach solution containing gold cyanide complex was prepared as follows. 100 mL of gold atomic absorption standard solution (available from Aldrich Chemical Co., as Catalog No. 20,716-0, having gold concentration of 1000±10 μg/mL) was added to a pyrex beaker and the solution was boiled to remove the water and hydrochloric acid. To the resulting dry gold-containing residue was added 1 L of deionized water, sufficient CaO to adjust the aqueous pH to between 10.5 and 11.0, and 1 gram of NaCN. The solution was mixed using a magnetic stirrer until all solids had dissolved to give the desired synthetic pregnant leach solution, which was submitted for gold assay using atomic absorption analysis.

Using a volumetric flask, two 500 mL portions of the above-made pregnant leach solution were measured and poured in two 2-L beakers which contained the appropriate weight of Surfactant 1 to make 5 ppm and 10 ppm solids (wt) surfactant solutions respectively. Using a magnetic stirrer with each beaker, the surfactant was dissolved using gentle agitation with a stirrer bar for about 10 to 15 minutes to give the surfactant-containing pregnant leach solutions.

Meanwhile, carbon for the adsorption studies was prepared by taking fresh coconut shell carbon (Type DG-11, 6/12 mesh, available from Sorb-Tech, Inc.), wet-screening through a 10 mesh sieve, discarding the sieved portion, and drying the remaining large particles overnight in a 120° F. (49° C.) oven to give prepared carbon.

Eight 120 mL plastic bottles were divided into two sets of four bottles. Bottles from the first set were rinsed with a few milliliters of the pregnant leach solution containing 5 ppm of Surfactant 1, drained, and charged with 0.25, 1.00, 1.75 and 2.50 g of the prepared carbon. Then approximately 100 mL of the pregnant leach solution containing 5 ppm of Surfactant 1 was added to each bottle. This same process was repeated with the second set of four bottles except this time the pregnant leach solution containing 10 ppm of Surfactant 1 was used. In this way, four different carbon/leach solution ratios were represented for each surfactant concentration. The eight bottles were capped and were agitated concurrently in a bottle-roll apparatus. After 24 hours, each sample was filtered to remove the carbon and the carbon was washed with 100 mL of deionized water. Each of the filtrate volumes was recorded and filtered carbon samples were dried overnight in the 120° F. (49° C.) oven. The carbon samples were analyzed for gold using fire assay, and the solutions were analyzed for gold using atomic absorption. The carbon loading in troy ounces of gold per short ton of carbon was calculated and a curve was constructed by plotting the amount of gold adsorbed (troy ounces per ton) per unit mass of adsorbent versus the residual gold concentration (ppm) in solution. Gold loading values for Surfactant 1 were then averaged from individual data points taken for all eight bottles.

The gold loading of carbon experiment was repeated except no surfactant was dissolved in the gold cyanide complex stock solution. This time, only four bottles were used, again containing 0.25, 1.00, 1.75 and 2.50 g of the prepared carbon, and the average gold loading value for these four samples was determined. The ratio of carbon area covered using Surfactant 1 compared to carbon area covered using no surfactant was then calculated as a percentage by dividing the average gold loading value using Surfactant 1 by the average gold loading value using no surfactant and multiplying by 100. The result for Example 7 is shown in Table 7.

Examples 8–12

In Examples 8–12, the procedure for Example 7 was repeated, except that Surfactant 1 was replaced by Surfactants 2–6 respectively. The results are shown in Table 7.

Comparative Example C3

In Comparative Example C3 the procedure for Example 7 was repeated, except that Surfactant 1 was replaced by Comparative Surfactant C1. The results are shown in Table 7.

TABLE 7

| Example | Surfactant | Percent of Carbon Area Covered Compared to No Surfactant |
| --- | --- | --- |
| 7 | 1 | 76.63 |
| 8 | 2 | 89.17 |
| 9 | 3 | 74.02 |
| 10 | 4 | 78.37 |
| 11 | 5 | 90.06 |
| 12 | 6 | 81.40 |
| C3 | C1 | 73.15 |

The data in Table 7 show that the fluoroaliphatic surfactants (Examples 7–12) all demonstrated less interference with the gold-adsorbing carbon surface than did the degradable hydrocarbon surfactant (Comparative Example C3), even though the hydrocarbon surfactant was run at concentrations far below its 50 ppm solids value measured in the actual pregnant solution (see Table 6).

Examples 13–15 and Comparative Example C4

In Examples 13–15, lixiviants containing very low concentrations of fluorosurfactants were compared to a lixiviant containing no surfactant (Comparative Example C4) in ability to wet dry precious metal ore. Proper wetting of the ore is critical to optimize precious metal recovery.

In Examples 13–14, aqueous alkaline cyanide lixiviants containing 50 ppm and 250 ppm solids respectively of Surfactant 2 were evaluated for wetting of ¼ inch size fraction ore particles of similar composition to ore used in Examples 1–6. The lixiviant used for surfactant addition was a barren solution (i.e., a solution which has gone through the total heap leach/zinc cementation cycle, is barren of the gold or silver cyanide complex, and normally would be destined to be returned to the heap for another cycle of precious metal leaching) obtained from the Coeur Rochester, Inc. heap leach facility, with pH in the 10–11.5 range.

In Example 15, the barren solution contained 10 ppm solids of Surfactant 4.

In Comparative Example C4, the barren solution was tested with no surfactant additive.

The same procedure was used for each wetting test. A graduated buret, 2.5 in (6.4 cm) in diameter, with a 1 in (2.5 cm) inlet at the top closable with a inserted glass stopper and a Teflon™ stopcock at the bottom for draining, was loaded with 400 g of ¼ inch size fraction ore, the same source of ore as used in Examples 1–6 and screened on a Gilson Test Master Screen Apparatus. 200 g of lixiviant was added to the buret over a five minute period. A liquid volume reading in the graduated buret was taken initially and was 360 mL. for each of the four tests. A volume reading was then taken after 15 minutes, after 24 hours, and after 4 days. Each of these readings was subtracted from the initial reading of 360 mL to calculate how much lixiviant was absorbed by the ore particles. Amounts of lixiviant absorbed for each surfactant concentration and after each time period are presented in Table 8.

TABLE 8

| Ex. | Surfactant Concentration | Surface Tension (dynes/cm) | Amount of Lixiviant Absorbed (mL) after: | | | |
|---|---|---|---|---|---|---|
| | | | Initial | 15 min. | 24 hrs. | 4 days |
| 13 | Surfactant 2, 50 ppm | 19 | 0 | 5 | 10 | 10 |
| 14 | Surfactant 2, 250 ppm | 19 | 0 | 5 | 10 | 10 |
| 15 | Surfactant 4, 10 ppm | 35 | 0 | 5 | 10 | 10 |
| C4 | No Surfactant | 72 | 0 | 0 | 5 | 5 |

The data in Table 8 show that absorption of lixiviant into the ore was greater when a fluorosurfactant was used compared to Comparative Example C4 which contains no surfactant. The data in Table 8 also show that the amount of lixiviant absorbed by the ore in Example 13 was the same as in Example 14, so one would predict that using Surfactant 2 at 50 ppm solids would give comparable performance as when used at 250 ppm solids, the level used in the leaching experiment of Example 8. Good absorption of lixiviant by the ore was noted when the surfactant was incorporated at a very low level of 10 ppm solids (Example 15 with Surfactant 4). In every case, the surfactant containing solutions showed rapid absorption into the ore mass, as early as 15 minutes, while the nonsurfactant containing solution required 24 hours of contact with the ore to show the same results.

Various modifications and alterations of this invention will be apparent to those skilled in the art without departing from the scope and spirit of this invention and this invention should not be restricted to that set forth herein for illustrative purposes.

What is claimed is:

1. A surfactant polymer, comprising;
   (A) at least 40% by weight of imerpolymerized units derived from $C_nF_{2n+1}(SO_2NR_1)_a(CH_2)_bOC(O)C(R_2)=CH_2$, where a is 0 or 1, b is 1 to 12, $R_1$ is $Ch_3$, $C_2H_4$, $C_3H_2$, or $C_4H_9$, and $R_2$ is H or $CH_3$;
   (B) at least 5% by weight of interpolymerized units derived from sulfonic acid containing, or sulfonic acid salt containing, free-radically polymerizable, ethylenically-unsaturated monomer; and
   (C) interpolymerized units derived from a polar, flee-radically polymerizable, ethylenically-unsaturated monomer.

2. A surfactant polymer, comprising:
   (A) at least 40% by weight of interpolymerized units derived from $C_2F_{2n+1}(SO_2N_1)_a(CH_2)_bOC(O)C(R_2)=CH_2$, where a is 0 or 1, b is 1 to 12, $R_1$ is $CH_3$, $C_2H_5$, $C_3H_7$, or $C_4H_9$, and $R_2$ is H or $CH_3$;
   (B) at least 5% by weight of interpolymerized units derived from suilfonic acid containing, or sulfonic acid salt containing, free-radically polymerizable, acrylate or methacrylate monomer; and
   (C) interpolymerized units derived from a polar, free-radically polymerizable, ethylenically-unsaturated monomer.

* * * * *

UNITED STATES PATENT AND TRADEMARK OFFICE
CERTIFICATE OF CORRECTION

PATENT NO. : 5,612,431

DATED : March 18, 1997

INVENTOR(S) : Jennifer E. Waddell, Michael J. Sierakowski, Patricia M. Savu, George G.I. Moore, Chetan P. Jariwala, Miguel A. Guerra Page 1 of 2

It is certified that error appears in the above-identified patent and that said Letters Patent is hereby corrected as shown below:

Col. 1, Line 29, "+2OH⁻" should read -- = $2Au(CN)_2^- + 2OH^-$ --

Col. 1, Line 39, "Supra" should read -- supra --

Col. 1, Line 40, "crushing,." should read -- crushing, --

Col. 3, Line 2, "J" should read -- J. --

Col. 3, Line 18, "JC" should read -- J. C. --

Col. 5, Line 34, "[OCH₂CH₂]ᵦ[OCH2" should read -- $[OCH_2CH_2]_b[OCH_2$ --

Col. 5, Line 60, "—N⁺⁽ᶜᴴ³⁾)" should read -- $-N^+(CH_3)$ --

Col. 6, Line 4, "moleties" should read -- moieties --

Col. 6, Line 30, "Dolymers" should read -- polymers --

Col. 7, Line 33, ")CH₂" should read -- $)CH_2$ --

Col. 7, Line 34, ")(CH₂)" should read -- $)(CH_2)$ --

Col. 7, Line 46, "⁺NH₄" should read -- $^+NH_4$ --

Col. 9, Line 3, "SURFACTANT6" should read -- SURFACTANT 6 --

Col. 9, Line 15, "C⁴" should read -- $C_4$ --

Col. 9, Line 15, "SO₃⁻⁾" should read -- $SO_3^-)$ --

Col. 15, Line 6, "mL." should read -- mL --

Col. 16, Line 11, "imerpolymerized" should read -- interpolymerized --

Col. 16, Line 14, "C₂H₄,C₃H₂," should read -- $C_2H_5, C_3H_7,$ --

Col. 16, Line 20, "flee" should read -- free --

UNITED STATES PATENT AND TRADEMARK OFFICE
CERTIFICATE OF CORRECTION

PATENT NO. : 5,612,431
DATED : March 18, 1997
INVENTOR(S) : Jennifer E. Waddell, Michael J. Sierakowski, Patricia M. Savu, George G.I. Moore, Chetan P. Jariwata, Miguel A. Guerra It is certified that error appears in the above-identified patent and that said Letters Patent is hereby corrected as shown below:

Col. 16, Line 30, "suilfonic" should read - - sulfonic - -

Signed and Sealed this

Twelfth Day of May, 1998

Attest:

BRUCE LEHMAN

Attesting Officer

Commissioner of Patents and Trademarks